(12) United States Patent
Andersen et al.

(10) Patent No.: US 9,206,786 B2
(45) Date of Patent: Dec. 8, 2015

(54) METHOD FOR ACOUSTICALLY MONITORING A WIND TURBINE, ACOUSTIC MONITORING SYSTEM FOR A WIND TURBINE AND RE-EQUIPMENT KIT

(75) Inventors: Jimmi Andersen, Holstebro (DK); Per Egedal, Herning (DK); Dennis Soebye Jensen, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 666 days.

(21) Appl. No.: 13/517,803

(22) Filed: Jun. 14, 2012

(65) Prior Publication Data
US 2012/0321464 A1 Dec. 20, 2012

(30) Foreign Application Priority Data
Jun. 14, 2011 (EP) .................... 11169777

(51) Int. Cl.
*F03D 7/02* (2006.01)
*F03D 11/00* (2006.01)

(52) U.S. Cl.
CPC ............. *F03D 11/00* (2013.01); *F03D 7/0296* (2013.01); *F03D 11/0091* (2013.01); *F05B 2260/80* (2013.01); *F05B 2260/83* (2013.01); *Y02E 10/722* (2013.01); *Y02E 10/726* (2013.01)

(58) Field of Classification Search
None
See application file for complete search history.

(56) References Cited

U.S. PATENT DOCUMENTS

| 6,785,637 | B1 | 8/2004 | Wobben | |
| 6,966,754 | B2 * | 11/2005 | Wobben | 416/61 |
| 8,292,568 | B2 * | 10/2012 | Watanabe | 415/1 |
| 2011/0192212 | A1 * | 8/2011 | Delprat et al. | 73/12.01 |

FOREIGN PATENT DOCUMENTS

| EP | 1222391 A1 | 7/2002 |
| EP | 1373723 A1 | 1/2004 |
| EP | 2026160 A1 | 2/2009 |
| JP | 2010281279 A | 12/2010 |
| WO | WO 2010040832 A1 | 4/2010 |

* cited by examiner

*Primary Examiner* — Edward Look
*Assistant Examiner* — Jason Davis

(57) ABSTRACT

A method for acoustically monitoring a wind turbine, in particular for monitoring the existence of loose objects inside the wind turbine is provided. A sound generated in a rotating part of the wind turbine is monitored during operation of the wind turbine which sound is analyzed with respect to specific parameter values of the sound within at least one specific frequency range and if such specific parameter values are detected, a signal for possible further actions is generated. An acoustic monitoring system for a wind turbine and a re-equipment kit are also disclosed.

13 Claims, 4 Drawing Sheets

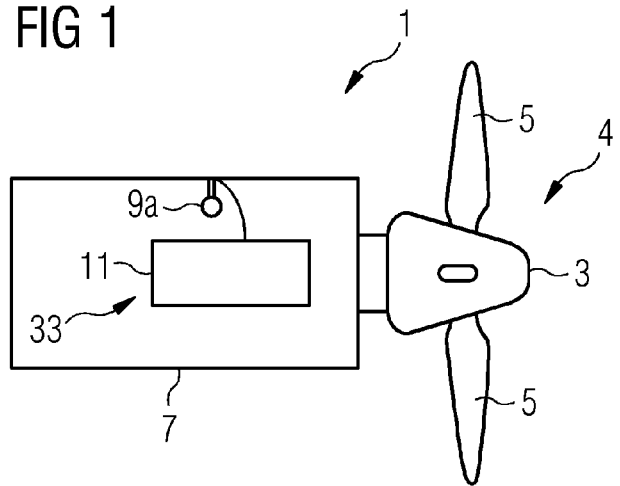
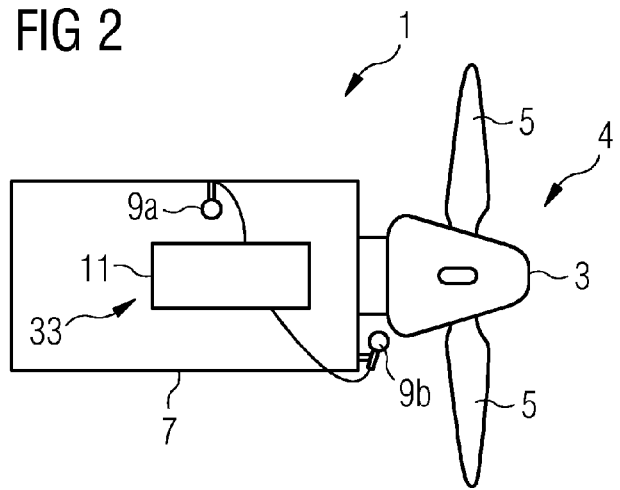
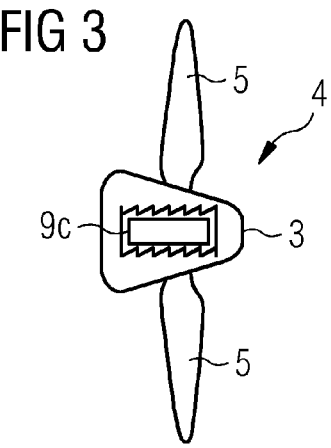

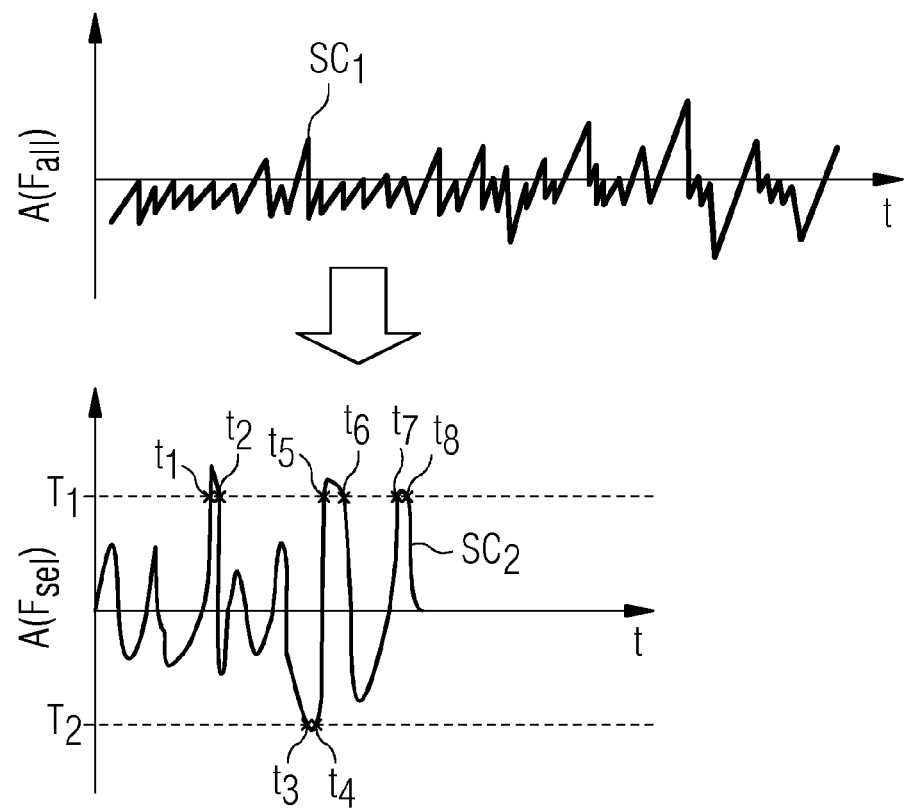

METHOD FOR ACOUSTICALLY MONITORING A WIND TURBINE, ACOUSTIC MONITORING SYSTEM FOR A WIND TURBINE AND RE-EQUIPMENT KIT

CROSS REFERENCE TO RELATED APPLICATIONS

This application claims priority of European Patent Office application No. 11169777.7 EP filed Jun. 14, 2011. All of the applications are incorporated by reference herein in their entirety.

FIELD OF INVENTION

The present invention concerns a method for acoustically monitoring a wind turbine, in particular for monitoring the existence of loose objects inside the wind turbine, whereby a sound generated in a rotating part of the wind turbine is monitored during operation of the wind turbine. It also concerns an acoustic monitoring system for a wind turbine and a re-equipment kit—also called a retrofit—for establishing an acoustic monitoring system for a wind turbine.

BACKGROUND OF INVENTION

Loose objects such as loose metal objects, e.g. bolts, screws, plates and others, can cause serious damage inside a wind turbine, in particular to those parts which are being moved during the operation of the wind turbine and/or to electric, electronic respectively hydraulic functional parts. Such loose object will be transported by a moving part, in particular by a rotating part such as the hub of the wind turbine. The loose objects inside a hub are lifted up to some height and will then fall down again. For instance, if a loose object lies on the bottom ground of a hub as the hub starts to rotate, the object will be transported higher due to the rotation movement of the hub and will the fall down again due to gravity. This goes on repeatedly during operation of the wind turbine so that more and more damage is caused, in particular in those regions in which objects can hit particularly vulnerable parts.

A solution of monitoring loose objects inside wind turbines has been proposed by U.S. Pat. No. 6,785,637 B1, namely acoustic monitoring. The method outlined there includes that an actually acquired frequency spectrum of sounds of the wind turbine is substracted from a reference frequency spectrum. This resulting difference spectrum may then be further inspected and an alarm may be set off in case of abnormalities. In particular, the difference spectrum can be monitored by staff in order to find out about such abnormalities. It is clear that such monitoring system and method is rather complex and requires large resources of computational power and in some cases also of manpower. Furthermore, the methodology of evaluation of abnormalities is rather vague as it is at least partially based on human judgement rather than on objective criteria.

SUMMARY OF INVENTION

It is thus an object of the present disclosure to provide for a possibility of how to monitor the sound inside a wind turbine in an improved way. For example in terms of simpleness of operation and/or lower costs and/or higher effectivity in operation and/or effectiveness in results.

In this context, the above-mentioned method is enhanced according to the invention by the fact that the sound is analyzed with respect to specific parameter values of the sound within at least one specific frequency range and if such specific parameter values are detected, a signal for possible further actions is generated.

The sound which is monitored comprises a sound produced in the inside of the rotating part of the wind turbine. The sound may be predominantly produced in side the rotating part of the wind turbine. This is in particular important for monitoring such problems which are caused by internal malfunctions of the wind turbine such as loose objects. Predominantly in this context means that measures are taken to detect a sound of which at least 30% stem from the inside of the rotating part of the wind turbine. Other embodiments allow for measures taken to detect a sound of at least 50% or at least 70% stem from the inside of the rotating part of the wind turbine. This can for example be realized by positioning and/or directing a sound converting component such as a microphone or the like into the inside of the rotating part in question. Other measures may include filtering or shielding away sounds coming from other locations than the inside of the wind turbine. The rotating part may in particular be the hub of the wind turbine, as outlined above.

This sound is thus analyzed with respect to these specific parameter values, which means that these parameter values are derived, for instance converted, from the sound.

The term "specific frequency ranges" is hereby defined as selected frequency ranges, i.e. in contrast to the total (i.e. overall) frequency range of sound. In an embodiment specific frequency ranges of the sound which is monitored while some frequencies are excluded. In other words: if one subtracts those excluded frequencies from the total frequency range one arrives at the specific frequency ranges. The inventors have found out that there are certain frequency ranges in which rotating parts of the wind turbine produce sounds in a normal operation mode, i.e. without distractions. In contrast, there are the other frequency ranges, i.e. the specific frequency ranges which are monitored in the context of the invention, in which normally no or hardly any sound is generated. Therefore, the analysis of the sound is restricted to those very specific frequency ranges in which hardly any sounds are usually to be expected. One can thus focus on these selected specific frequency ranges for further analysis whilst leaving out the other frequency ranges. It is in these specific frequency ranges in which signals in the sound can be expected which may represent abnormalities in the operation of the rotating part of the wind turbine, in particular, as outlined above, the existence of loose objects. Sound within these specific frequency ranges represents a kind of dissonance representative of possible faults in the operation of the wind turbine.

Therefore, the invention makes use of limiting the focus to monitor only some selected frequency ranges, which can in fact be quite small ranges, instead of taking into account the complete sound range as in the state-of-the-art. Therefore, firstly, computational resources can be saved whilst, secondly, the clear focus on those limited specific frequency ranges also allows for more detailed and systematic analysis of the frequencies in question. It can thus be expected that the method according to the invention can be highly precise and very effective at the same time.

If particular specific parameter values, such as amplitude signals of a certain value, within those selected specific frequency ranges are detected, a signal is generated which may trigger off further actions such as a cross-check by other systems, an alarm or even a complete close-down of the wind turbine's operation until staff have inspected the wind turbine on site. The signal thus does not automatically necessitate further actions but can also just be handed over for further processing and evaluation. For instance, a recording of the sound and/or of the specific frequency range of the sound can also be listened to by staff or be further converted and analyzed in more depth. Thereby one may even be able evaluate which kind of loose object—be it dangerous to operation or not—has come loose. This way it can be made possible to take different measures in dependence of results of such further analysis.

In analogy, an acoustic monitoring system of the aforementioned kind comprises:
- a sound monitoring unit which in operation monitors a sound generated in a rotating part of the wind turbine,
- an analyzation unit which is realized such that it analyzes the sound with respect to specific parameter values of the sound within at least one specific frequency range,
- a generation unit which in operation generates a signal for possible further actions if such specific parameter values are detected.

Thereby, some of these components of the acoustic monitoring system may be realized purely as a software components run on a processor as well as pure hardware, but also as a combination of both. Software solutions can in particular be realized in the context of the analyzation unit and of the generation unit, whereas the sound monitoring unit may comprise a software-based evaluation unit and possible hardware units which feed the evaluation unit with sound signals. Thus, the sound monitoring unit may comprise an input device and an evaluation unit, whereby the input device may for instance be realized as a sound converting component such as mentioned above.

It can be concluded that the acoustic monitoring system according to the invention can be used to carry out the method according to the invention.

The invention also concerns a wind turbine with a rotor and a generator and with an acoustic monitoring system according to the invention. It further concerns a re-equipment kit for establishing an acoustic monitoring system for a wind turbine, in particular for monitoring the existence of loose objects inside the wind turbine.

Such re-equipment kit comprises at least an analyzation unit which is realized such that it analyzes the sound with respect to specific parameter values of the sound within at least one specific frequency range. In other words, the re-equipment kit may simply be an analyzation unit and comprise no more parts, maybe apart from interfaces to connect to other parts such as those mentioned in the context of the acoustic monitoring system according to the invention. With such a re-equipment kit it is possible to establish an acoustic monitoring system by using components of existing monitoring systems or indeed of any other system not directly connected previously with acoustic monitoring.

According to an embodiment, frequencies within at least one of the specific frequency ranges are at least partially filtered. Such filtering may mean that those particular frequencies within the specific frequency range are filtered out of the overall sound, but in particular it may instead filter out all sounds of other frequency ranges and then have the specific frequency range in question as a result. This means that only sound within the specific frequency range is permitted further for an analysis. Said filters may include low-pass and/or band-pass and/or band-stop filters. High-pass filter may be used, because the inventors have found out that in particular loose objects in wind turbines produce sounds of rather high frequencies, i.e. above 1 kHz. It is possible that at least one selected specific frequency range is above 1 kHz, such as above 1.5 kHz, or even above 2 kHz. This makes sure that the high frequencies caused by loose objects will be included in the analysis.

The specific frequency ranges and also the specific parameter values which are searched for can be derived by several methods. For instance, it is possible to derive at least one specific frequency range and/or specific parameter value from a database. Such database can for instance include results from previous tests and thus function as a kind of standardised knowledge base on the basis of which sounds are analyzed. Another possibility, which can be used as an alternative or as an additional feature, is to determine at least one specific frequency range and/or specific parameter value during the operation of the wind turbine and/or of a wind turbine specimen representative of the wind turbine. Such wind turbine specimen representative of the wind turbine in question may typically be of the same type, i.e. the same make, of wind turbine or of a similar type of wind turbine for which similar parameter values and/or a similar frequency behaviour are expected. In other words, experimental values are derived in conditions of the wind turbine which are at least highly similar to those in which the wind turbine in question is operated so that it is made sure that the exactness of detection of abnormalities is as high as possible.

In this context of experimental derivation of specific parameter values and/or specific frequency ranges use can be made of an analysis of phase information relating to the sound of the wind turbine. This phase information can for example be analyzed by the means of FFT analysis—i.e. Fast Fourier Transformation analysis. In this context it needs to be stressed that such analysis will not be necessary at a later stage during the operation of the acoustic monitoring system for monitoring purposes but rather only delivers the database for selecting the specific frequency ranges in question and/or the specific parameter values which are going to be analyzed on their own in the aftermath.

It can be expected that within the sound range there will be sounds in virtually any frequency range of the spectrum. Therefore, it may be necessary that the detection of the specific parameter value is carried out only if the specific parameter value is above or below a certain threshold value. Such a threshold value may be defined by a filter but it may also be inherent in the acoustic monitoring system due to the sensitivity of measurement of an input device which converts the sound into electric or electronic sound signals. By introducing such threshold value or threshold values it can be thus made sure that no sound within the specific frequency range is considered which is only a kind of background noise and in fact not indicative of any kind of abnormalities within the operation of the wind turbine.

Concerning the specific parameter values in question, it is possible that at least one of these within at least one of the specific frequency ranges represents an amplitude of one or more frequencies within the specific frequency range. That means that several frequencies within the specific frequency range can be combined and their amplitudes taken together or that any particular frequency can be taken on its own and its amplitude be monitored. A parameter value which represents an amplitude may be an amplitude value itself or a value from which there can be directly or indirectly derived an amplitude value by simple calculation methods whereby it is unnecessary to use additional measurements to arrive at the amplitude value.

The analysis of the specific parameter values may comprise digital processing, but may also simply be transferred through a threshold filter as indicated above. If one analyzes the amplitude of the frequencies within the specific frequency range, one will indirectly analyze the loudness of the sound within this specific frequency range. That in return means that the louder the sound, the more alarming one can expect the state of the wind turbine to be. For instance, if a large loose object produces sounds within the wind turbine, one can expect that the sound which it generates is much louder than that of a smaller loose object (provided they have the same mass density). A larger object of a same mass density will also mean a higher danger for the operation of the wind turbine.

Therefore, analyzing the sound within the specific frequency range with respect to the amplitude of those frequencies, can also give an indirect indication of the seriousness of abnormality which currently occurs within the rotating part of the wind turbine. Analyzing the amplitude is thus a very effective and direct means of monitoring the sound within the specific frequency range.

Generally, it is possible to generate one single signal any time when a specific parameter value within any of the specific frequency ranges can be detected. If is possible that a number and/or a duration of occasions of detections of the specific parameter values and/or values representing a level of the specific parameter values is/are integrated. That means that there will be a counter or an integrator which counts how often and/or which integrates how long the specific parameter values are detected and/or adds together over time different levels of the specific parameter values. For instance, if a specific parameter value within the specific frequency range is just detected at one instant and never again later for a longer time, it can be expected that some influence on the wind turbine has occurred which does not repeat itself and which probably does not pose any particular threat to the operation of the wind turbine. In contrast, if there is a constant detection of specific parameter values, possibly with a high intensity (i.e. a high parameter value level) as well, this can constitute a state of high alarm and should possibly trigger of an immediate close-down of wind turbine operation in order to prevent further damages. Integrating the duration and/or the number of occasions of detections of the specific parameter values within the specific frequency ranges and/or of values representing a level of the specific parameter values is thus an effective means of how to evaluate the quality of abnormalities which occur within the wind turbine. This can be generated surprisingly easy by a simple counter and/or integrator mechanism which can even be realized as an analogue system rather than a digital one. However, it certainly is also possible to use a digital system instead of an analogue one.

In this context, it is also possible to generate, based on such integration, different levels of alarm depending on the number and/or on the duration of detections and/or values representing a level of the specific parameter values. It is possible that a first level of alarm is activated at a first level of numbers and/or durations of detections and/or accumulated values representing a level of the specific parameter values and that a second level of alarm is activated at a second level of such integrated values. The first level may for example be characterized by switching on an alarm signal such as an alarm light or the like while at the second level of alarm possibly an immediate close-down of wind turbine operation can be triggered off by activating the emergency braking system of the wind turbine.

As outlined above, different input devices, i.e. sound converting components, can be used for converting the sound into electric and/or electronic sound signals. For example, a microphone can be used, i.e. a device which converts vibrations in the air (or any gas) into electric or electronic signals. Alternatively piezoelectric components can be used, i.e. devices which convert body vibrations of liquid or solid bodies into electric or electronic signals.

As for the location in which the sound is converted into sound signals, according to a first embodiment of the invention this is carried out at the outside of the wind turbine. This provides that an overall impression of the sounds of the wind turbine can be generated, whilst it is still possible to focus on the sounds from the inside of the wind turbine if wished for. This can be realized by directing e.g. the microphone or any other input device into the direction of the wind turbine so that sounds from the inside which are loud enough will be detected by the microphone or the like. In this context the input device may be shielded from exterior influences, which exterior influences are not directly connected to the wind turbine's operation. Such influences can for instance be due to weather conditions, in particular to the sounds of the wind or to raindrops falling onto the input device.

According to a second embodiment, which can be applied as an alternative to the first embodiment or as an add-on, the sound is converted into sound signals at the inside of the wind turbine, for example inside a hub of the wind turbine. This way the input device is closer to the location where possible dangerous loose objects are falling around and thus a clearer picture of what is happening inside the rotating part of the wind turbine may be generated. The input device can also be located inside a stationary part of the wind turbine such as the nacelle (in this context "stationary" is also used for the nacelle although it rotates around an axis defined by the tower of the wind turbine—this is due to the fact that the nacelle with respect to other, rotating parts constitutes a kind of reference system). From the nacelle the input device can then be directed into or at the rotating part of the wind turbine. Such location makes it possible that the input device does not stand in the way of rotating elements of the rotating part and its measurement can be also completely uninfluenced by the rotational movement.

The time range from the generation of the sound, for instance by loose objects, to its detection may be at a minimum. This is particularly so because it is not necessary to consult staff for an evaluation of sounds within the wind turbine. Therefore, it is possible that monitoring the sound and initiating further actions is carried out on a real-time basis, i.e. as soon as the signal indicating abnormalities in the operation of the wind turbine has been generated, the further actions may be taken, automatically, instantaneously. This way one can prevent further damages to the wind turbine and make sure that the maximum level of caution and safety is realized in its operation.

Concerning the acoustic monitoring system itself, one embodiment is realized if the sound monitoring unit contains and/or is connected to an analogue/digital converter for converting analogue sound signals into digital signals. This means that the sound signals which are further processed are digital signals. Alternatively, the sound monitoring unit is an analogue system which in operation directly processes analogue sound signals. Such an analogue system is typically simpler to make and easier to operate or to exchange fully or in part. This has the effect that any existing wind turbine can easily be re-quipped with an acoustic monitoring system according to the invention based on analogue signal processing.

BRIEF DESCRIPTION OF THE DRAWINGS

Other objects and features of the present invention will become apparent from the following detailed descriptions considered in conjunction with the accompanying drawings.

It is to be understood, however, that the drawings are designed solely for the purposes of illustration and not as a definition of the limits of the invention.

In the drawings, like reference numbers refer to like objects throughout. Objects in the diagrams are not necessarily drawn to scale.

Figure 4:
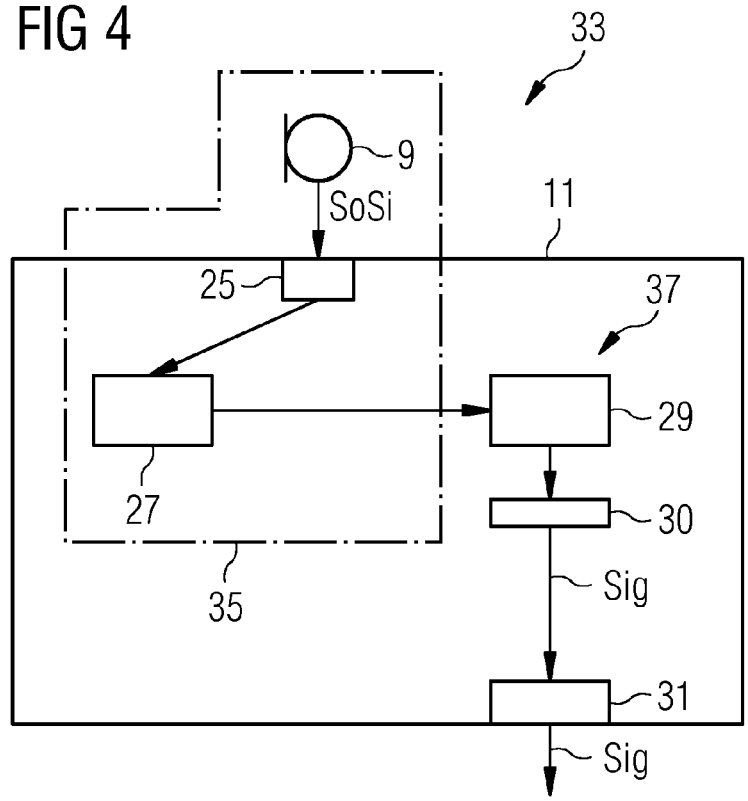
Figure 5:
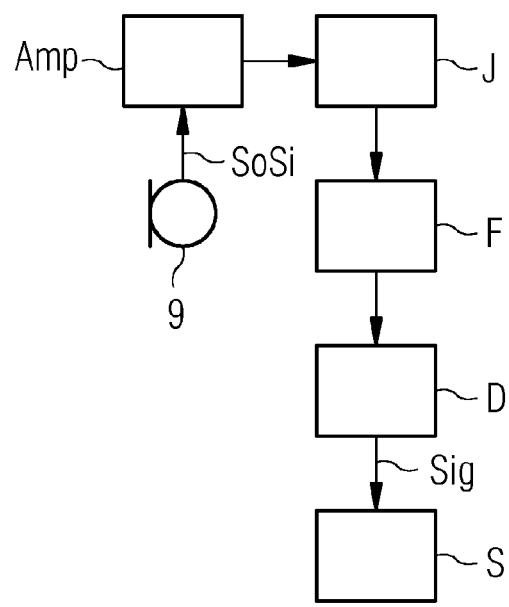
Figure 6:
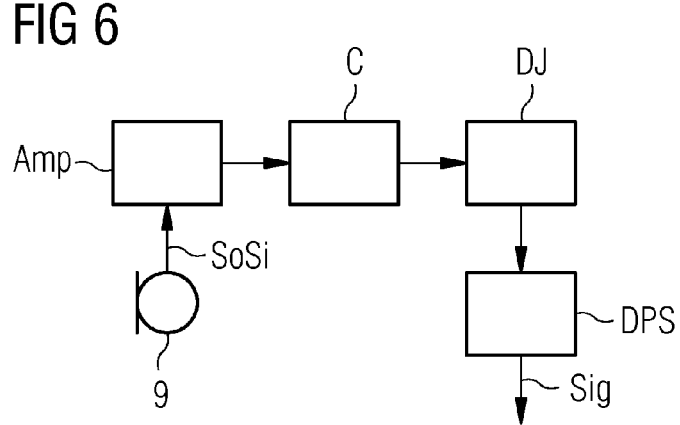
Figure 7:
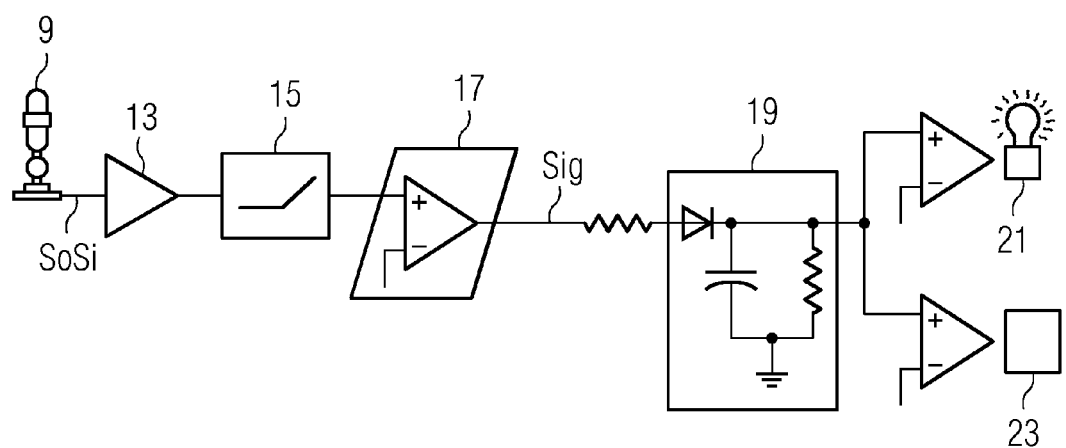

FIG. 1 shows a schematic view of a wind turbine according to a first embodiment of the invention, FIG. 2 shows a schematic view of a wind turbine according to a second embodiment of the invention, FIG. 3 shows a schematic view of a hub of a wind turbine according to a third embodiment of the invention, FIG. 4 shows a schematic block view of an acoustic monitoring system according to an embodiment of the invention as can be used in any of the previously shown wind turbines according to FIGS. 1 to 3, FIG. 5 shows in a schematic block diagram of an embodiment of the method according to the invention, FIG. 6 shows in a schematic block diagram of a first solution in the context of the embodiment shown in FIG. 5, FIG. 7 shows a circuit diagram of an acoustic monitoring system according to the invention realized to carry out a method according to a second solution in the context of the embodiment shown in FIG. 5, FIG. 8 shows two sound curves which are handled in the context of an embodiment of the method according to the invention.

DETAILED DESCRIPTION OF INVENTION

FIG. 1 shows a wind turbine 1 comprising a nacelle 7 and a rotor 4 which is rotatable connected to the nacelle 7. The rotor 4 comprises a hub 3 and rotor blades 5. When wind comes along the rotor blades 5 the hub 3 will automatically be put into a rotational movement along its rotation axis. In the nacelle 7 an input device 9a, i.e. a sound converting component 9a, in this case a microphone 9a, is attached to the inner roof. It is connected to a sound control monitoring device 11. Together, the sound control monitoring device 11 and the microphone 9a constitute an acoustic monitoring system 33.

If an irregularity, i.e. an abnormality in operation of the wind turbine 1, occurs in the sense that in a rotating part, in this case for instance the hub 3, there are unusual sounds, the sound in the rotating part is converted by the microphone 9a into sound signals which are then transferred it to the sound control monitoring device 11. This is where the sound signals are further processed by using a method according to the invention, which will be explained by examples later on.

FIG. 2 shows a second embodiment of a wind turbine 1 according to the invention. Apart from the features already mentioned in the context of FIG. 1, the acoustic monitoring system 33 comprises a second sound converting component 9b, again a microphone 9b, which is also connected to the sound control monitoring device 11 but which is situated outside of the nacelle 7 and indeed on the outside of the wind turbine 1. In this arrangement, sound coming from the hub 3 will be monitored both from the inside of the nacelle 7 and from the outside of the wind turbine 1. Also, the sounds can be monitored separately from each other. It may be added that certainly more than two input devices 9a, 9b can also be used in case it is necessary in order to generate an overall impression of sounds within the hub 3. Placing the sound converting component 9b outside the wind turbine can firstly imply that the sound converting component 9b can be brought closer to the hub 3 than is the case with the sound converting component 9a inside the nacelle 7. Secondly, sound generated in the inside of the wind turbine 7 such as generator noises or noises by a gearbox—which are both typically placed within the nacelle 7—can essentially be excluded from monitoring. Additionally, it is possible to shield away sound influences which have largely nothing to do with the operation of the wind turbine 1, for instance raindrops falling onto the microphone 9b or wind noise. For that purpose, a mechanical shield (not shown) can be used and also (alternatively or additionally), the sound control monitoring device 11 may comprise filters—be they mechanical, electrical or electronic filters—that filter away such sounds stemming from these external influences.

FIG. 3 shows a hub 3 of a wind turbine 1 according to a third embodiment of the invention. Here a sound converting component 9c, again a microphone 9c, is placed inside the hub 3 so that it is very close to any causes of sounds, in particular of irregular sounds such as those caused by loose objects, in the wind turbine's hub 3. In such arrangement no shielding of external sounds is usually necessary, and the microphone 9c is much closer to the monitored unit and further away from other components of the wind turbine 1 which could cause noises, such as the generator or a gearbox, as mentioned above.

FIG. 4 shows in a schematic block view an embodiment of an acoustic monitoring system 33 in a more detailed way. The acoustic monitoring system 33 comprises a sound converting component 9, and again a microphone 9, which is connected to a sound control monitoring device 11. The sound control monitoring device 11 comprises an input interface 25 and an output interface 31. In between these interfaces 25, 31 there are arranged an evaluation unit 27, an analyzation unit 29, and a generation unit 30. The microphone 9 together with the input interface 25 and the evaluation unit 27 make up together a sound monitoring unit 35 (which may also comprise additional elements not shown in this context). Basically, in this sound monitoring unit 35 sound is converted into sound signals SoSi by the microphone 9 and is further processed via the interface 25 in the evaluation unit 27 so that the sound signals SoSi then can be further processed via the following units 29, 30. The analyzation unit 29 is realized such that it analyzes the sound, i.e. the sound signals SoSi, within at least one specific frequency range. This frequency range may have been preselected, for instance pre-filtered, by the evaluation unit 27, for which the latter may for example include a filtering system for filtering specific frequency ranges. The analyzation unit analyzes within this specific frequency range parameter values and checks whether specific parameter values of a preselected kind can be detected within the parameter values. This information is handed on to the generation unit 30 which generates a signal Sig in such case. This signal Sig is handed over via the output interface 31 to other units which may possibly take further actions such as trigger off alarms or a close-down of the operation of the wind turbine 1 altogether.

The analyzation unit 29 can also be used as a re-equipment kit 37 for re-equipping a wind turbine or an acoustic monitoring system so that these are realized. Such re-equipment kit 37 may comprise additional units such as any ones shown in the context of the acoustic monitoring system 33, as single units or combined with others.

FIG. 5 shows an embodiment of the method in a block diagram. From the microphone 9 sound signals SoSi are first amplified in an amplification step Amp and then pass through an interfacing step J after which the sound signals SoSi are filtered in a filtering step F. Following this the amplitude of the filtered sound signals SoSi is detected in an amplitude detection step D. If this amplitude is higher than a certain threshold value signals Sig are generated and further passed on for signal processing S. The parameter which is inspected in this case is the amplitude of the sound signals SoSi which have previously been filtered. This amplitude is a parameter which can easily be analyzed so that if the value of the amplitude is above a certain amplitude threshold value the signal Sig is generated.

FIG. 6 shows an embodiment which can be considered as a sub-embodiment of the one shown in FIG. 5. Again, sound is converted by a microphone 9 and the resulting sound signals SoSi are amplified by a microphone amplifier in an amplification step Amp. This is followed by analogue to digital converting C, and the interfacing procedure in this case is a digital interface procedure DJ. The signal filtering F and the amplitude detection D as shown in FIG. 5 are carried out here by using digital signal processing DPS. Again, a signal Sig is generated if the amplitude within the selected specific frequency range is above a certain threshold value.

FIG. 7 shows schematically an analogue circuit for carrying out an embodiment of the method in a purely analogue way. From the microphone 9 sound signals SoSi are passed through a microphone amplifier 13 and then a high-pass filter 15 which only permits such frequency ranges above a certain threshold level, in this case a level of frequencies above 1 kHz. The filtered sound signals then pass a threshold filter 17 which will only lead signals Sig through if the amplitude of the sound signals that have passed the high pass filter 15 exceeds a certain amplitude threshold value. In other words, the signals Sig are signals representing the amplitude of the sound within the selected frequency range. The louder this sound, the more intense the signals Sig. These signals Sig are then integrated in an integrator 19 which comprises a capacitor and which thus collects electric loads of the signals Sig. The stronger these signals are and/or the longer they last, the more loads will be collected by the capacitor. If these collected loads exceed threshold levels different levels of alarm are generated: a first level of alarm will be set off by an alarm signal 21 at a first threshold level of the integrated signals Sig and at a second, higher, level, a warning signal 23 will be triggered off which may for example result in closing down completely the operation of the wind turbine 1 in order to almost immediately prevent any further damages therein.

FIG. 8 shows how sound signals are dealt with. On top, a first signal curve $SC_1$ is depicted. The curve $SC_1$ shows the amplitude A of the sound including all of its frequencies $F_{all}$ over time t. Both axes have no scale as this is just as a schematic and exemplary curve $SC_1$. From this first signal curve $SC_1$ there is derived a second signal curve $SC_2$ of sound signals SoSi from a specific frequency range $F_{sel}$. Therefore, the amplitude $A(F_{sel})$ of this selected, i.e. specific frequency range $F_{sel}$ is depicted over time t, again with no scales on both axes for the same reason as above. If the second signal curve $SC_2$ exceeds a certain first threshold value $T_1$, namely an upper threshold value $T_1$, signals Sig as mentioned above will be generated. The same is the case if the second signal curve $SC_2$ goes below a second threshold value $T_2$, namely a lower threshold value $T_2$. This is the case at certain points of time within the curve, namely the points of time $t_1$, $t_3$, $t_5$, and $t_7$, while at other points of time $t_2$, $t_4$, $t_6$, and $t_8$ the curve $SC_2$ is between the two threshold values $T_1$, $T_2$ so that the signals Sig will not be generated after the curve $SC_2$ has passed these points up until it passes one of threshold values $T_1$, $T_2$ again.

To conclude, the method may be realized in some circuits or logics which are easy to produce and to install. It is based on principles which can be easily applied and at the same time offer a high degree of preciseness nevertheless. Filtering the sound signals SoSi in particular means that a lot of computational power is saved because potentially a great part of the frequency ranges within the sound spectrum can be cut off from detection logics.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof. For the sake of clarity, it is to be understood that the use of "a" or "an" throughout this application does not exclude a plurality, and "comprising" does not exclude other steps or elements.

The invention claimed is:

1. A method for acoustically monitoring the existence of loose objects inside a wind turbine, comprising:
    monitoring a sound generated in a rotating part of the wind turbine during operation of the wind turbine;
    analyzing the sound with respect to specific parameter values of the sound within at least one specific frequency range,
    wherein frequencies within at least one of the specific frequency ranges are at least partially filtered,
    wherein the at least one specific frequency range and/or specific parameter value is derived from a database and/or the at least one specific frequency range and/or specific parameter value is determined during the operation of the wind turbine and/or of a wind turbine specimen representative of the wind turbine,
    wherein a number and/or a duration of occasions of detections is/are integrated of the specific parameter values and/or values representing a level of the specific parameter values from the sound generated; and
    generating a signal when such specific parameter values are detected.

2. The method according claim 1,
    wherein at least one specific frequency range is above 1 kHz.

3. The method according claim 2,
    wherein at least one specific frequency range is above 1.5 kHz.

4. The method according claim 3,
    wherein at least one specific frequency range is above 2 kHz.

5. The method according claim 1,
    wherein the specific frequency range and/or specific parameter value is determined by analyzing phase information relating to the sound.

6. The method according claim 1,
    wherein the signals are generated and further passed on for signal processing only if the specific parameter value is above or below a certain threshold value.

7. The method according claim 1,
    wherein the specific parameter value within at least one of the specific frequency ranges represents an amplitude of one or more frequencies within the specific frequency range.

8. The method according to claim 1,
    wherein a first level of alarm is activated at a first level of numbers and/or durations of detections and/or values representing a level of the specific parameter values and wherein a second level of alarm is activated at a second level of numbers and/or durations of detections and/or values representing a level of the specific parameter values.

9. The method according claim 1,
wherein the sound is converted into sound signals at the outside of the wind turbine.

10. The method according claim 1,
wherein the sound is converted into sound signals at the inside of a hub of the wind turbine.

11. An acoustic monitoring system for monitoring the existence of loose objects inside a wind turbine, comprising:
a sound monitoring unit which monitors a sound generated in a rotating part of the wind turbine during operation of the wind turbine;
an analyzation unit which analyzes the sound with respect to specific parameter values of the sound within at least one specific frequency range,
wherein frequencies within at least one of the specific frequency ranges are at least partially filtered,
wherein the at least one specific frequency range and/or specific parameter value is derived from a database and/or the at least one specific frequency range and/or specific parameter value is determined during the operation of the wind turbine and/or of a wind turbine specimen representative of the wind turbine,
wherein a number and/or a duration of occasions of detections is/are integrated of the specific parameter values and/or values representing a level of the specific parameter values from the sound generated; and
a generation unit which generates a signal when the specific parameter values are detected.

12. A wind turbine with a rotor and a generator and with an acoustic monitoring system according to claim 11.

13. A re-equipment kit for establishing an acoustic monitoring system for monitoring the existence of loose objects inside the wind turbine according to claim 12, wherein the
analyzation unit analyzes the sound with respect to specific parameter values of the sound within at least one specific frequency range,
wherein the at least one specific frequency range and/or specific parameter value is derived from a database,
wherein the re-equipment kit interfaces to connect to other parts of the acoustic monitoring system.

\* \* \* \* \*